United States Patent
Shikakura et al.

[11] Patent Number: 6,108,379
[45] Date of Patent: *Aug. 22, 2000

[54] RECEIVING APPARATUS FOR PERFORMING A FILTER PROCESS TO SELECTIVELY SYNTHESIZE IMAGE SIGNALS TO CONTROL IMAGE QUALITY

[75] Inventors: Akihiro Shikakura, Utsunomiya; Masato Kato, Omiya, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/780,004

[22] Filed: Dec. 23, 1996

[30] Foreign Application Priority Data

Dec. 28, 1995 [JP] Japan .................................. 7-343890

[51] Int. Cl.[7] ...................................................... H04N 7/24
[52] U.S. Cl. ........................ 375/240; 348/397; 348/845.1
[58] Field of Search .................................... 348/384, 390, 348/400–402, 409–413, 415, 416, 433, 699, 845.1, 845.2, 397, 399; 382/232, 236, 238; 375/240; H04N 7/130, 7/137, 7/24

[56] References Cited

U.S. PATENT DOCUMENTS 4,882,614 11/1989 Kageyama et al. ..................... 348/433
5,070,503 12/1991 Shikakura .
5,148,272 9/1992 Acampora et al. ..................... 348/390
5,212,695 5/1993 Shikakura et al. .
5,455,629 10/1995 Sun et al. ............................. 348/845.1
5,543,853 8/1996 Haskell et al. ....................... 348/845.2
5,581,481 12/1996 Weerackody et al. .................. 382/232
5,703,649 12/1997 Kondo ................................... 348/416
5,719,646 2/1998 Kikuchi et al. ...................... 348/845.1
5,731,840 3/1998 Kikuchi et al. ......................... 348/416

*Primary Examiner*—Richard Lee
*Attorney, Agent, or Firm*—Fitzpatrick, Cella, Harper & Scinto

[57] ABSTRACT

A receiving apparatus receives a hierarchically encoded image signal and detects an error in the image signal. Then a filter process is performed on the image signal, the filter process being controlled based on the output of the error detections. More particularly, the image signal has multiplexed therein a first encoded image signal having a lower image quality and a second encoded image signal for obtaining a higher image quality. These are decoded to obtain a first decoded image signal and a second decoded image signal, and the position of an error in an image frame of the image signal is detected. Then a mode of the apparatus is set to one of a plurality of modes according to the detection, the modes including a first mode in which an image signal having the higher quality is obtained by synthesizing the first and second decoded image signals and a second mode in which an image signal having the lower image quality is obtained by inhibiting a synthesizing operation of the second decoded image signal to the first decoded image signal.

37 Claims, 8 Drawing Sheets

RECEIVING APPARATUS FOR PERFORMING A FILTER PROCESS TO SELECTIVELY SYNTHESIZE IMAGE SIGNALS TO CONTROL IMAGE QUALITY

BACKGROUND OF THE INVENTION

1. Field of the Invention

The present invention relates to an image signal transmission system, and more particularly to a system capable of transmitting and receiving hierarchically encoded image signal through a transmission line (satellite, ground wave, cable etc.) or a recording medium.

2. Related Background Art

Recent progress in the semiconductor technology has stimulated the digitization of the television image, thus enabling digital transmission in the broadcasting and in the storage medium. However, the digital transmission, having steep threshold characteristics at the practical limit, is associated with a drawback that the image quality becomes deteriorated suddenly beyond the limit point. For example in a satellite system generally utilizing the ku band (14/12 GHz) or the ka band (30/20 GHz) for the carrier frequency, there is encountered significant attenuation by rain, and the C/N ratio of the received signal becomes extremely low in a hard rain condition. Also in a ground wave system, the signal level is lowered behind a building, in case of reception in a moving vehicle. A similar phenomenon is experienced also in case of signal reproduction on a video cassette recorder or the like, caused for example by head clogging.

In order to overcome such drawbacks mentioned above, there has been developed the hierarchic encoding-decoding technology capable of so-called "graceful degradation", which, under an unfavorable receiving or reproducing condition, preferentially reproduces the information important in the image configuration thereby enabling recognition of the content of the image, while disregarding the information of lower priority.

In such "graceful degradation", a low-quality image signal obtained by compressing the input image signal with a very high compression rate and a residual image signal obtained by encoding a difference (residual) signal, representing the difference between a signal decoded from the above-mentioned low-quality image signal and the original signal, are transmitted in multiplexed form.

The above-mentioned low-quality image signal is of low hierarchic quality allowing enough recognition of the content of image by itself, and a high-quality image of higher definition can be obtained at the reception side, by adding the residual image signal to such low-quality image signal.

FIG. 8 shows the encoding characteristics of two transmission lines applied in the hierarchic encoding-decoding technology mentioned above, with the theoretical values in case of QPSK digital modulation for the transmission. The abscissa indicates the C/N ratio of the transmission line, while the ordinate indicates the bit error rate (BER: rate of error per unit amount of information in the transmitted bit stream). In FIG. 8, a curve A represents the QPSK characteristics without encoding, while a curve B indicates the transmission characteristics after a convolution encoding of $r=7/8$ on the remainder bit stream, and a curve C indicates those after a convolution encoding of $r=1/2$ on the low-quality bit stream.

As shown in FIG. 8, a satisfactorily low bit error rate (BER) corresponding to sufficient image quality can be obtained both in the low-quality bit stream or the residual bit stream, if the C/N ratio is sufficiently high. However, when the C/N ratio is lowered to about 8 dB, the BER of the residual bit stream represented by the curve B reaches a level of $1\times10^{-5}$ which is insufficient for the error correction, but the low-quality bit stream represented by the curve C still provides a sufficiently low BER. When the C/N ratio is further lowered to about 6 dB, the BER of the residual bit stream of the curve B approaches $1\times10^{-2}$, so that most of the received data become error. Even in such state, the low-quality bit stream of the curve C shows a BER as low as about $1\times10^{-10}$. When the C/N ratio is further lowered to 4 dB, the amount of errors becomes higher even in the low-quality bit stream.

Since the BER of the residual bit stream varies significantly in a threshold range of the C/N ratio around 6 to 8 dB, if the bit stream fluctuates around or remains in such threshold range, the quality of the decoded image signal varies frequently between the upper hierarchic quality and the lower hierarchic quality, thus creating a very unpleasant situation for the user.

SUMMARY OF THE INVENTION

An object of the present invention is to resolve the drawbacks mentioned above.

Another object of the present invention is to realize providing of stable image, even in a situation where the error rate of the received image signal is fluctuating.

Still another object of the present invention is to provide the image of an as high quality as possible, even when the received image signal contains errors.

The foregoing objects can be attained, according to an embodiment of the present invention, by a receiving apparatus comprising:

reception means for receiving a hierarchically encoded image signal;

error detection means for detecting an error in the image signal received by the reception means;

filter means for effecting a filter process on the image signal received by the reception means; and control means for controlling the filter process of the filter means, based on the output of the error detection means.

Still other objects of the present invention, and the features thereof, will become fully apparent from the following detailed description of the embodiments of the present invention, to be taken in conjunction with the attached drawings.

DETAILED DESCRIPTION OF THE PREFERRED EMBODIMENTS

Now the present invention will be clarified in detail by preferred embodiments thereof, with reference to the attached drawings.

Figure 1:
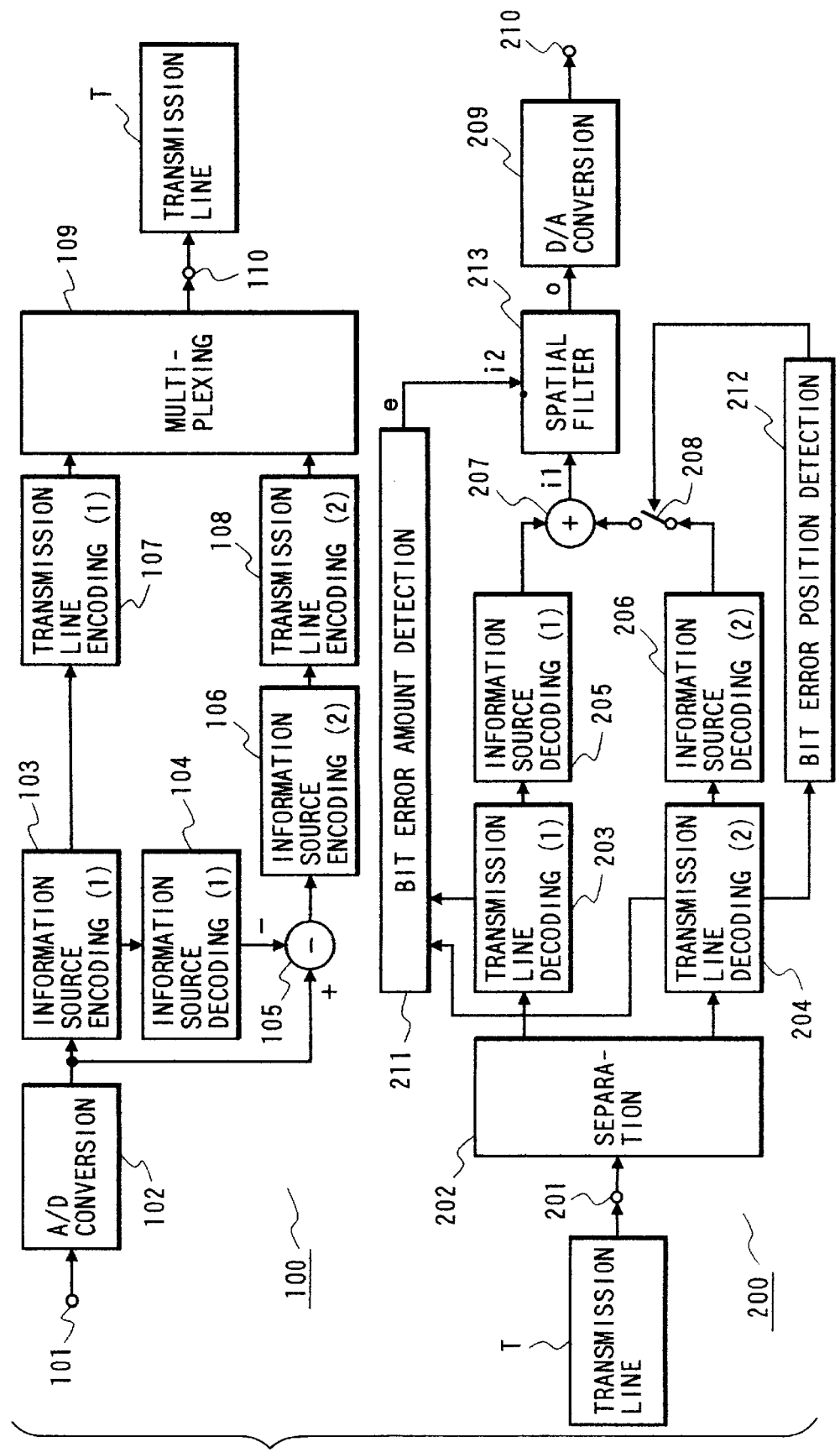
FIG. 1 is a block diagram of an embodiment of the present invention.

FIG. 1 is a block diagram of an image signal transmission system, constituting an embodiment of the present invention and composed of an image signal encoding apparatus 100 relating to the present invention and an image signal decoding apparatus 200 in which the present invention is applied. At first there will be explained the function of the entire system.

In the encoding apparatus 100, an image signal entered from an input terminal 101 is digitized by an A/D converter 102, and is encoded in an information source encoder (1) 103 with a very high compression rate to generate a low-quality bit stream. The compression in this case is achieved by the movement-compensating intrafield/interfield/interframe anticipation adaptive DCT, which is a block encoding method effecting the encoding for each block consisting of a predetermined number of pixels. Then the low-quality bit stream mentioned above is immediately decoded by an information source decoder (1) 104. The algorithm of the decoder 104 is inverse to that of the information source encoder (1) 103, and the frame rate and the number of pixels after decoding are same as those in the original signal format. The decoded image signal is of the lower hierarchic image quality, allowing enough recognition of the content of the image though the image quality is low because of the compression with a high compression rate.

Then a subtractor 105 determines the difference between the original digital image signal coming out of the A/D converter 102 and the output from the information source decoder (1) 104. The obtained difference data are compressed by an information source encoder (2) 106 to provide a residual bit stream. The compression of the difference data is achieved by the movement-compensating intrafield/interfield/interframe anticipation adaptive DCT, as in the information source encoder (1) 103. The residual bit stream thus obtained is used as information for obtaining the image signal of the upper hierarchic quality.

Then, for correcting the errors generated in the transmission line, the low-quality bit stream is subjected, in a transmission line encoder (1) 107, to a convolution encoding (r=½) and an error detection encoding for each of the above-mentioned blocks consisting of the predetermined number of pixels. Also the residual bit stream is subjected, in a transmission line encoder (2) 108, to a convolution encoding (r=⅞) and a similar error detection encoding. The error detection encoding to be employed can be a CRC (cyclic redundancy check) encoding, but there may also be employed an encoding method capable of correction, such as the RS (Read Solomon) encoding. Subsequently, both bit streams are multiplexed in a multiplexing unit 109, after the ID addition for the identification of each bit stream, then subjected to QPSK modulation and released to a transmission line T through an output terminal 110. Thus modulated output signal is transmitted either through a real-time transmission path such as a satellite, a ground wave system or a cable (not shown), or by an accumulating transmission path such as a video cassette recorder or a memory disk.

Figure 8:
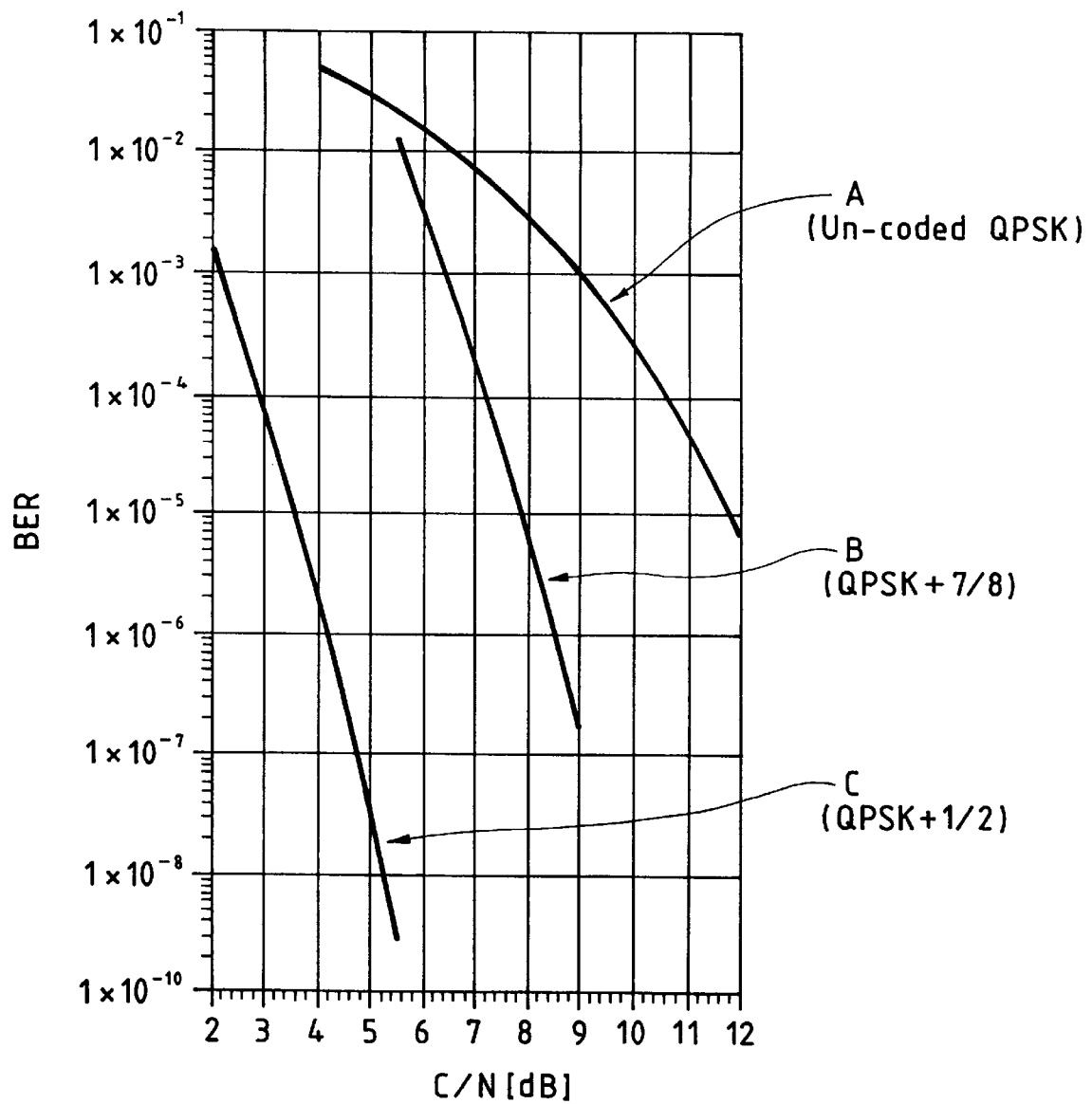
FIG. 8 is a chart showing the behavior of C/N ratio and bit error rate of an image signal, a low-quality image signal and a remainder image signal.

On the other hand, in the decoding apparatus 200, the modulated signal transmitted through the above-mentioned transmission path T is received from an input terminal 201, then QPSK decoded in a separation unit 202 into a digital signal, which is further separated, based on the ID, into a convolution encoded low-quality bit stream and a convolution encoded remainder bit stream. The former bit stream is supplied to a transmission line decoder (1) 203, which effects decoding of the convolution codes (r=½) obtained in the transmission line encoder (1) 107 of the encoding apparatus, and the errors generated in the received signal are corrected by the decoding algorithm. The ability of such correction is represented by the curve C in FIG. 8. On the other hand, the convolution encoded residual bit stream is supplied to a transmission line decoder (2) 204, which effects decoding of the convolution codes (r=⅞) obtained in the transmission line encoder (2) 108 of the encoding apparatus, and the errors generated in the received signal are corrected by the decoding algorithm. The ability of such correction is represented by the curve B in FIG. 8.

The low-quality bit stream decoded in the transmission line decoder (1) 203 is subjected to decoding in an information source decoder (1) 205 in a similar manner as in the information source decoder (1) 104 of the encoding apparatus, thereby providing a low-quality image signal. Also the residual bit stream decoded in the transmission line decoder (2) 204 is subjected to decoding in an information source decoder (2) 206 based on the compression executed in the information source encoder (2) 106 of the encoding apparatus, thereby providing a residual image signal. Such residual image signal is supplied through a switch 208 to an adder 207 where it is added to the low-quality image signal.

The image signal, obtained by adding the low-quality image signal and the residual image signal in the adder 207, is subjected to a filtering process to be explained later in a spatial filter 213 with variable transmission characteristics, thereby outputting an analog image signal through a D/A converter 209 and an output terminal 210. Such output image signal is of the lower hierarchic quality allowing enough recognition of the content of the image in case the residual image signal is not added in the adder 207 to the low-quality image signal, or of the higher hierarchic quality in case all the residual image signal is added.

In the following there will be explained the error detection and the corresponding process in the present embodiment.

At first there will be explained a bit error amount detection unit 211, which determines the bit error rate (BER) from the number of errors per unit time, based on the decoded result of error detection codes in the two transmission line decoders 203, 204. The C/N ratio of the transmission line is obtained from thus determined BER, according to the characteristic A shown in FIG. 8. Based on such C/N ratio, the bit error amount detection unit 211 outputs a coefficient e of the filter 213 according to characteristics shown in FIG. 2. In the present embodiment, the coefficient e is selected as 0 for the C/N ratio equal to or lower than 5 dB and equal to or higher than 9 dB, and as 1 for the C/N ratio at 7 dB, and is varied linearly from 0 to 1 in a C/N from 5 to 7 dB and from 1 to 0 in a C/N from 7 to 9 dB. In this manner the coefficient of the filtering process is adaptively modified in a range where the bit error rate of the residual image signal fluctuates significantly inducing frequent transitions of the output image signal of the adder 107 between the higher quality state and the lower quality state. In the foregoing description, the coefficient e is defined by the C/N ratio for the purpose of clarity, but it is not essential to convert the BER into the C/N ratio in the hardware configuration since the BER and the C/N ratio are uniquely correlated.

Figure 3:
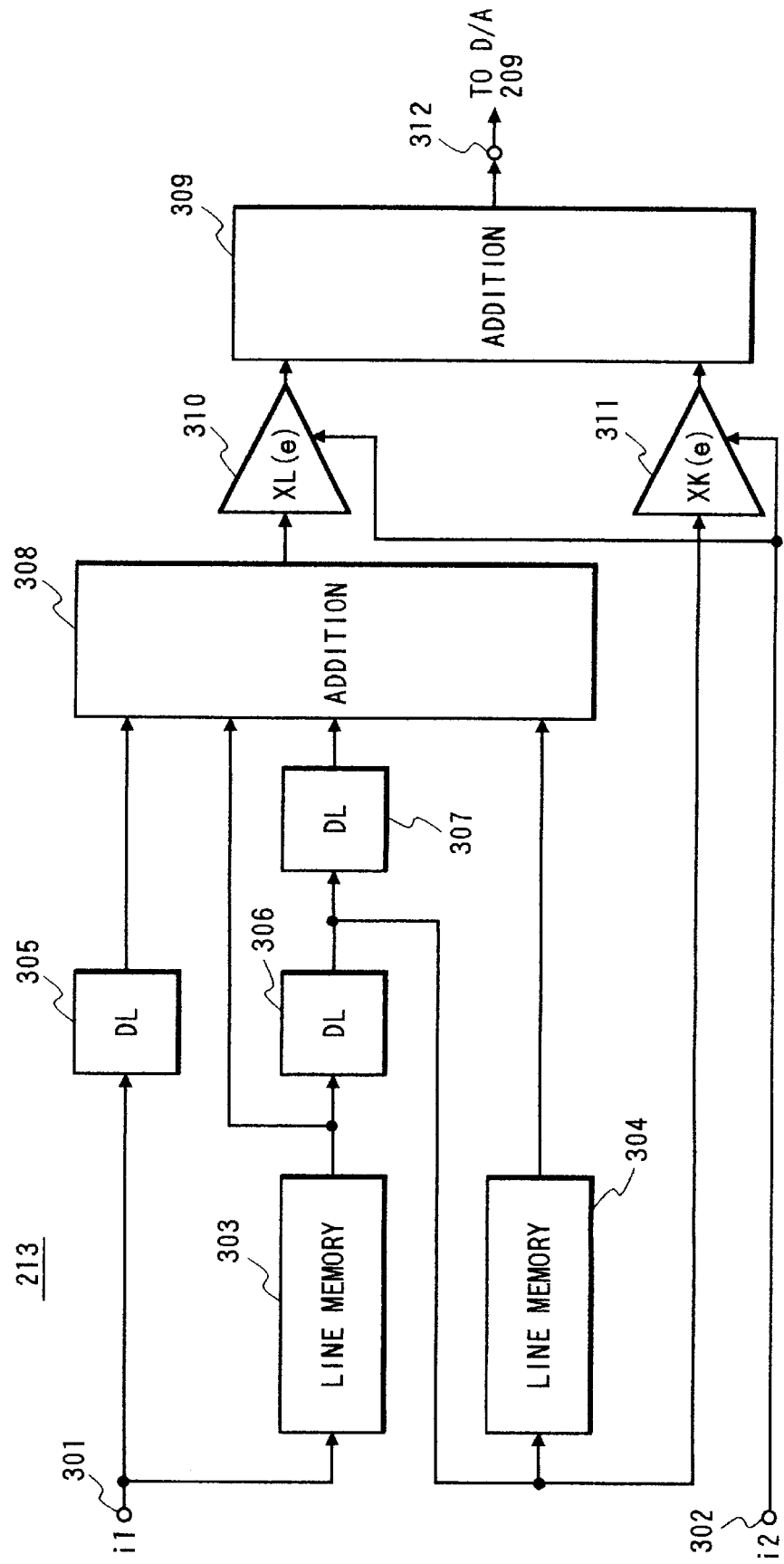
FIG. 3 is a block diagram showing an example of the configuration of the filter to be employed in the embodiment of the present invention.

FIG. 3 is a block diagram showing an example of the configuration of the spatial filter 213 with variable transmission characteristics. In FIG. 3 there are provided input terminals 301, 302 respectively corresponding to inputs i1, i2 of the spatial filter 213 with variable transmission characteristics shown in FIG. 1; an output terminal 312 corresponding to an output o in FIG. 1; line memories 303, 304 for delaying the image signal by a line; latches (DL) 305, 306, 307 for delaying the image signal by a time corresponding to a pixel; adders 308, 309 for outputting the sum of inputs; and multipliers 310, 311 for multiplying the signal e with a coefficient according to a signal supplied from the bit error detection unit 211 as explained before. More specifically, the multiplier 310 effects multiplication with a coefficient L(e), which is selected as L=0.5e/4 in the present embodiment, according to the signal e, while the multiplier 311 effects multiplication with a coefficient K(e), which is selected as K(e)=1−0.5e in the present embodiment, according to the signal e In case of e=0, the filter 213 transmits the input signal without any filtering process. In case of e=1, the filter 213 effects a symmetrical filtering of a 3×3 matrix with a coefficient 0.5 for the data of the central pixel and a coefficient 0.125 for the data of the peripheral pixels, and in case e assumes a value within a range from 0 to 1, the filtering process is conducted with filter characteristics corresponding to such value.

As explained in the foregoing, the present embodiment effects the filtering process in the vicinity of the level where the C/N ratio of the received signal or the BER of the residual image signal fluctuates significantly to cause frequent transitions of the higher quality image and the lower quality image, whereby the image can be reproduced in stable manner without such frequent transitions of the high quality image and the low quality image. More specifically, in a portion where the bit error rate varies significantly due to the change in the C/N ratio, the filtering process is applied whereby the reproduced image can be stabilized. On the other hand, in a portion where the bit error rate varies only slightly by the change in the C/N ratio, the filtering process is not applied to provide the image of high quality without image blur resulting from the filtering process.

Also in the bit error position detecting unit 212 shown in FIG. 1, the position of the bit error, which is not corrected in the decoding of the convolution codes (r=⅞) in the residual bit stream is detected by the error detection code, and the switch 208 is accordingly so controlled as not to add the signal of the block, which may contain errors not corrected in the error correction, to the low-quality image signal from the decoder 205.

As explained in the foregoing, for the characteristics of the transmission line in the present embodiment, the error correction for the residual bit stream becomes insufficient and the proper reproduction of the data becomes impossible in case the C/N ratio is reduced for example to 6–8 dB.

In the present embodiment, therefore, the bit error position detecting unit 212 detects the exact position of such uncorrectable data by the error detection code attached at the encoding operation, whereby the residual image signal containing errors is not added to the low-quality image signal and such low-quality image signal alone is outputted in the error-containing portions within a frame.

More specifically, in the present embodiment, as the portion where the residual image signal contains an error can be specified within the frame, the addition or the non-addition of the residual image signal can be controlled in a unit smaller than a frame. Consequently, in comparison with the case of signal transmission with simple convolution encoding, there is achieved a higher probability of obtaining a high quality image.

As explained in the foregoing, the high quality image is obtained in a portion where the residual image signal provides a C/N ratio higher than the predetermined threshold value and allowing error correction, and the low quality image is obtained only in a portion where the C/N ratio is lower than the above-mentioned threshold value and is insufficient.

Though the image quality is lowered in the latter portion, the low quality image only exists in such portion within the entire image area while the remaining portion thereof is composed of the high quality image, so that, as a whole, the high quality image can be obtained to a lower C/N ratio with a limited increase in the redundancy, in comparison with the case of transmission without the addition of the error detection code after convolution encoding.

Figure 2:
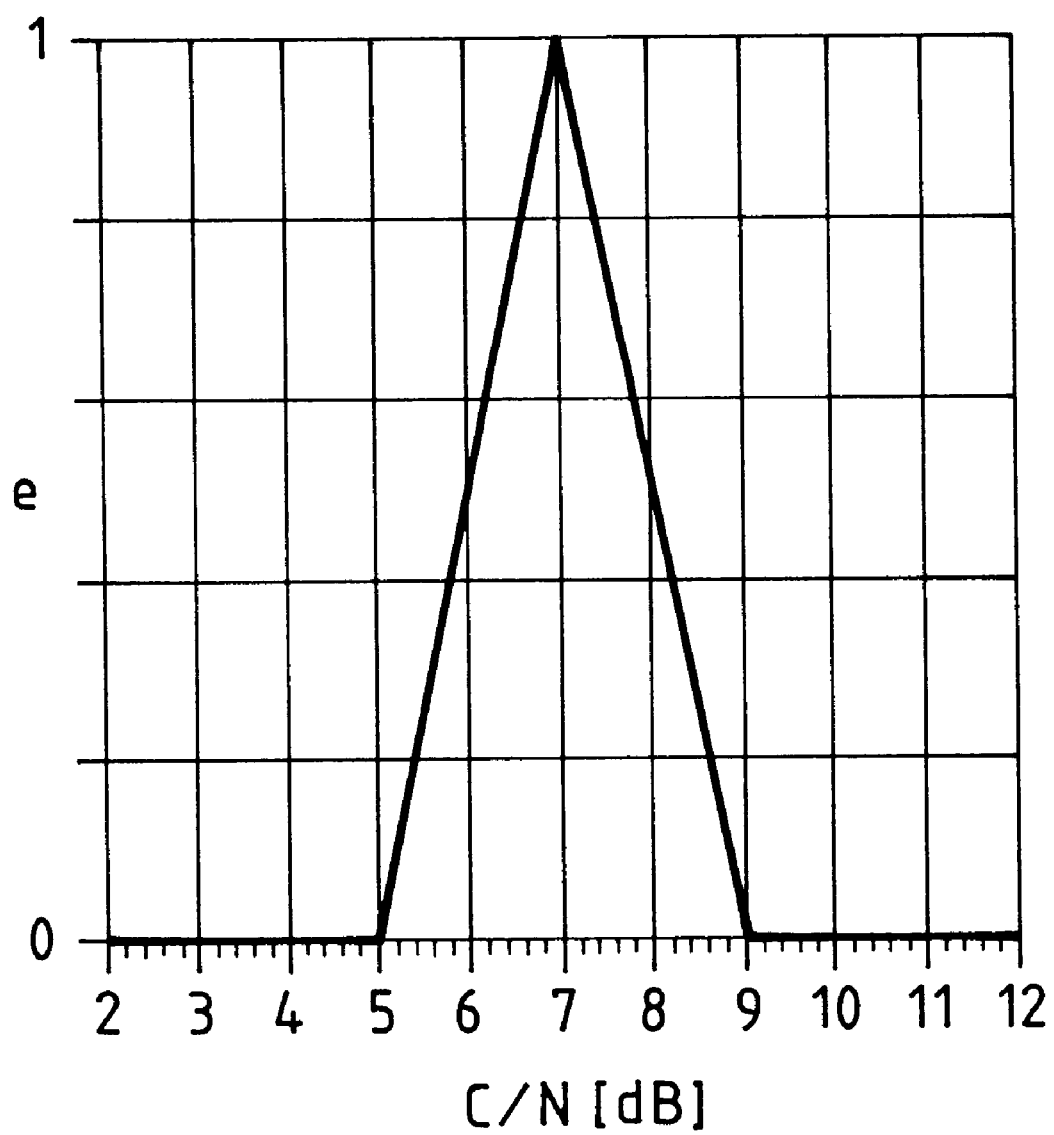
FIG. 2 is a chart showing the characteristics of a filter to be employed in the embodiment of the present invention.

The characteristics, shown in FIG. 2, of the bit error amount detecting unit 211 of the present embodiment are merely an example, and there can be applied various modifications for example on the range of e=0, range of e=1, linearity, whether the filter is completely transmitting, the filtering characteristics etc.

Figure 4:
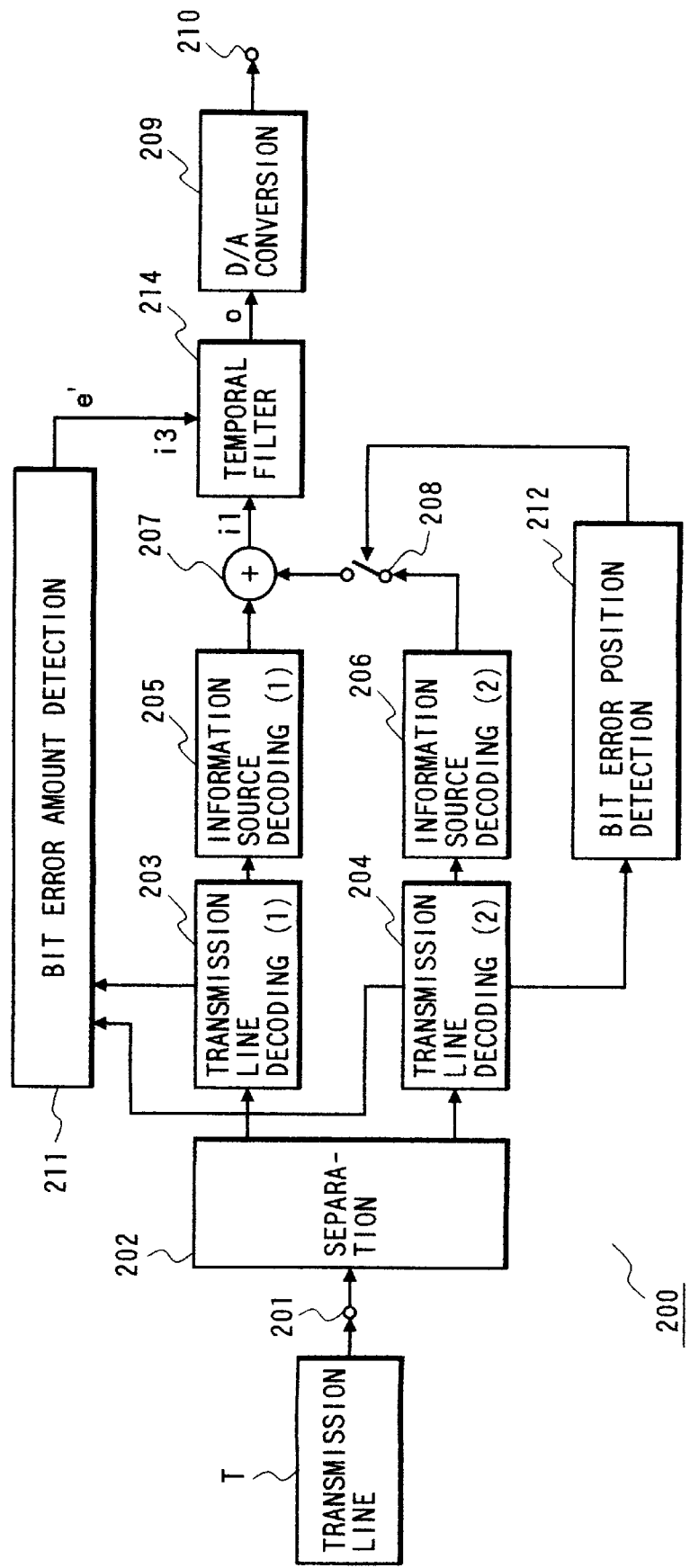
FIG. 4 is a block diagram of another embodiment of the present invention.

In the following there will be explained another embodiment of the present invention. FIG. 4 is a block diagram of an image decoding apparatus of such another embodiment. The encoding apparatus to be employed in this embodiment is identical with that shown in FIG. 1 and will not, therefore, be explained.

In the configuration shown in FIG. 4, the image signal obtained by adding the low-quality image signal and the remainder image signal is transmitted by a temporal filter 214 with variable transmission characteristics, then by a D/A converter 209 and output from an output terminal 210. Such output image signal is of the lower hierarchic quality allowing enough recognition of the content of the image in case the residual image signal is not added in the adder 207 to the low-quality image signal, or of the higher hierarchic quality in case all the residual image signal is added.

In the following there will be given an explanation on a bit error amount detection unit 211, which, also in the present embodiment, determines the bit error rate (BER) from the number of errors per unit time, based on the decoded result of error detection codes in the two transmission line decoders 203, 204. The C/N ratio of the transmission line is obtained from thus determined BER. This provides the characteristic A shown in FIG. 8. Then the bit error amount detecting unit 211 outputs the coefficient e' according to the characteristics shown in FIG. 6. In the present embodiment, the coefficient e' is selected as 0 for the C/N ratio equal to or higher than 9 dB, and as 1 for the C/N ratio equal to or lower than 4 dB, and is varied linearly from 1 to 0 in a C/N range of 5–9 dB. Therefore, also in this embodiment, the coefficient of the filtering process is adaptively modified in a range where the bit error rate of the residual image signal fluctuates significantly inducing frequent transitions of the output image signal of the adder 207 between the higher quality state and the lower quality state.

Figure 5:
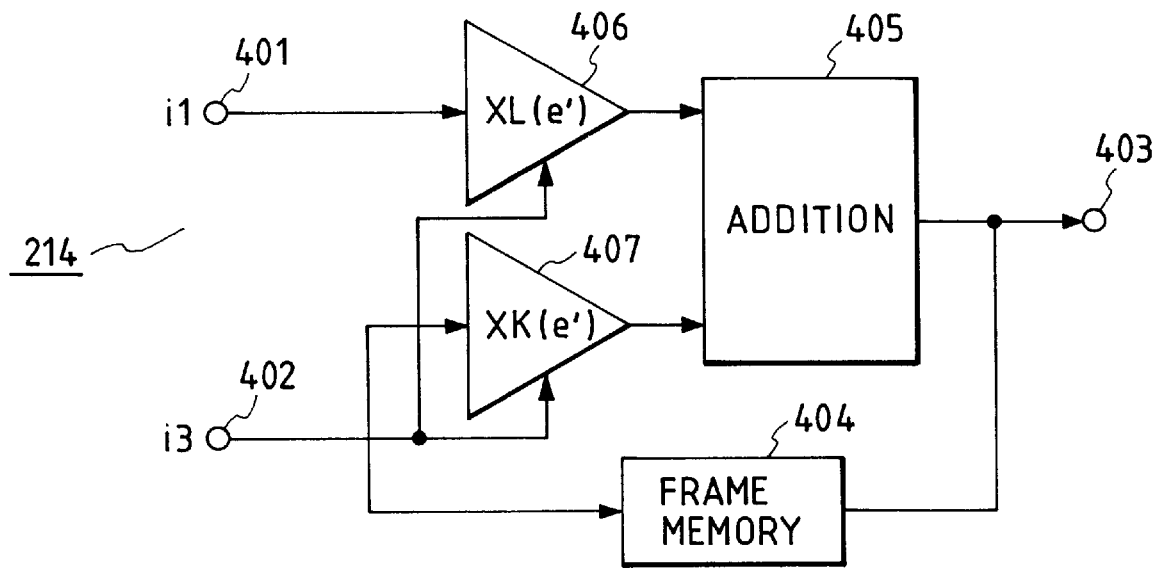
FIG. 5 is a block diagram showing another example of the configuration of the filter to be employed in the embodiment of the present invention.

FIG. 5 is a block diagram showing an example of the configuration of the temporal filter 214 with variable transmission characteristics. In FIG. 5, there are provided input terminals 401, 402 respectively corresponding to inputs i1, i3 of the spatial filter 214 with variable transmission characteristics shown in FIG. 4; an output terminal 403 corresponding to an output o in FIG. 4; a frame memory 404 for delaying the image signal by a frame; an adder 405 for outputting the sum of inputs; and multipliers 406, 407 for multiplying the input image signal with a coefficient according to a signal e'. More specifically, the multiplier 406 effects multiplication with a coefficient L(e'), which is selected as L(e') 1−0.8e', according to the signal e', while the multiplier 407 effects multiplication with a coefficient K(e'), which is selected as K(e')=0.8e' in the present embodiment, according to the signal e'. Thus the filter 214 transmits the input signal without any filtering process in case of e'=0, while effects a temporal filtering process of variable transmission characteristics with a factor 0.8 in case of e'=1, and, for an interim value of e', effects a filtering process with filter characteristics corresponding to such value of e'.

Figure 6:
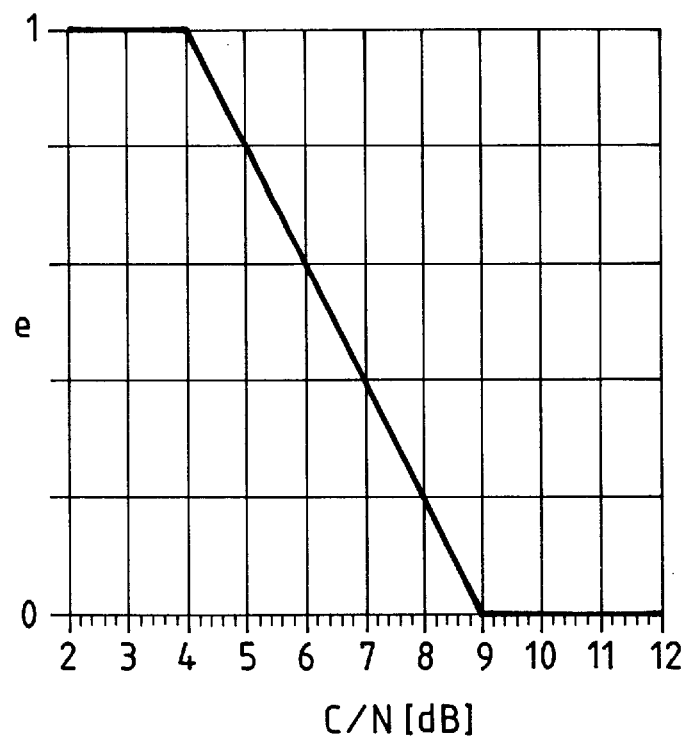
FIG. 6 is a chart showing the characteristics of another filter to be employed in the embodiment of the present invention.

The bit error position detecting unit 212 is basically same as that shown in FIG. 1 and serves to control the switch 208. The characteristics shown in FIG. 6 are merely an example, and can be modified for example with respect to the range where e'=0, range where e'=1, linearity, whether the filter is completely transmitting, the filtering characteristics etc.

As explained in the foregoing, the present embodiment effects a filtering process with constant characteristics in the range with the C/N ratio of the received signal or the BER of the remainder image signal equal to or lower than 4 dB where the BER of the residual image signal becomes large and in the range with the C/N ratio equal to or higher than 9 dB where the BER becomes small, and effects a filter process with adaptively varied filtering characteristics in the C/N ratio from 4 to 9 dB where the BER of the residual image signal fluctuates significantly to cause frequent transitions of the higher quality image and the lower quality image, whereby the image can be reproduced in stable manner without such frequent transitions of the high quality image and the low quality image.

In the following there will be explained another embodiment of the present embodiment.

Figure 7:
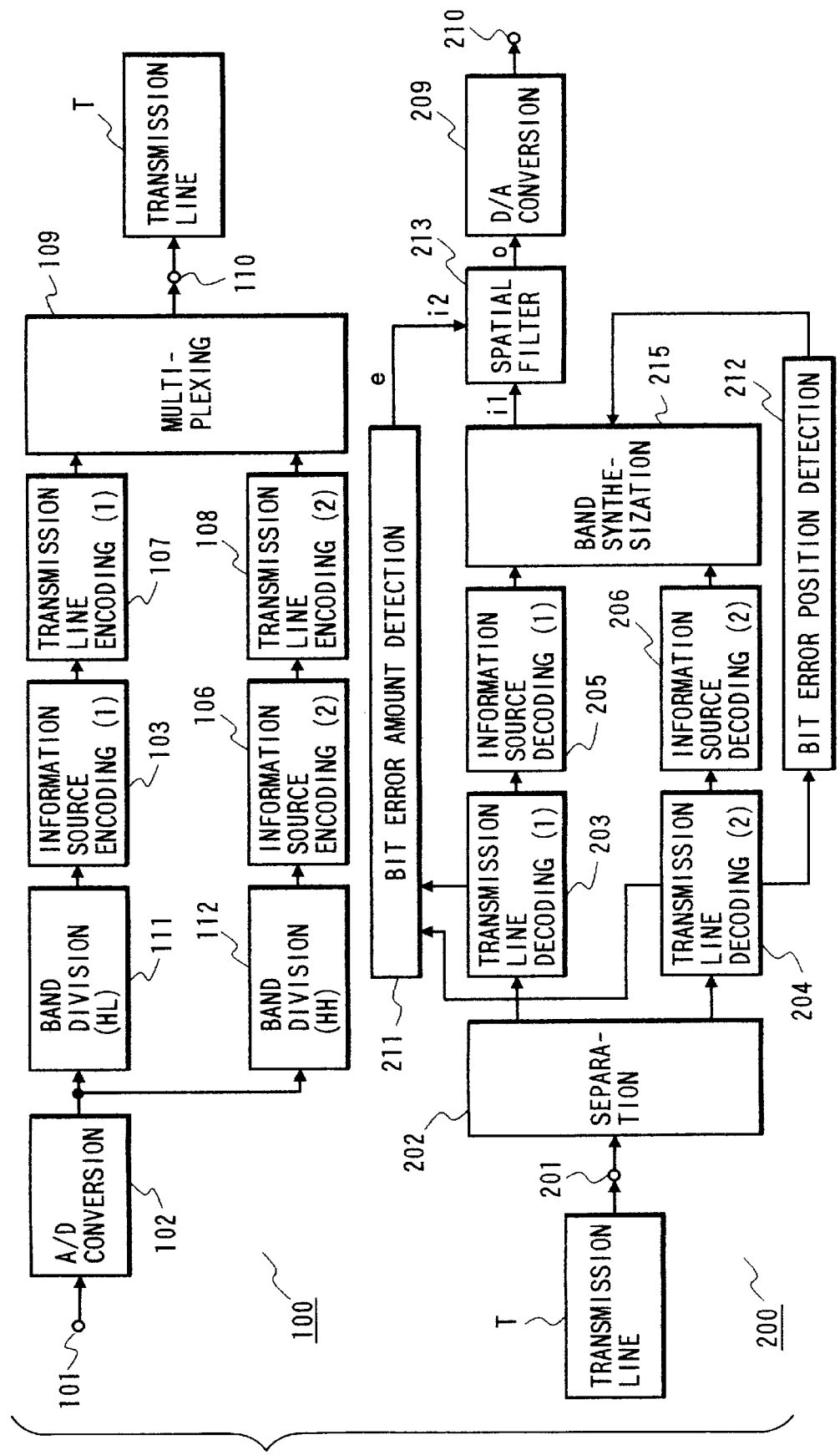
FIG. 7 is a block diagram of still another embodiment of the present invention.

FIG. 7 is a block diagram showing the configuration of an image signal transmission system constituting a third embodiment, wherein components same as those in FIG. 1 are represented by corresponding numbers.

In the encoding apparatus 100 shown in FIG. 7, the image signal entered from the input terminal 101 is digitized by the A/D converter 102. Then the input image signal is subjected to band division in the horizontal direction by a band dividing circuit (HL) 111 to obtain the low frequency components only. They are then compressed by the information source encoder (1) 103 with a very high compression rate as explained in the foregoing, thereby obtaining the low-quality bit stream.

On the other hand, the input image signal is subjected to the band division in the horizontal direction by a band dividing circuit (HH) 112 to obtain the high frequency components only. They are then compressed by the information source encoder (2) 106 to obtain the remainder bit stream.

Then, for correcting the errors generated in the transmission line, the low-quality bit stream is subjected, in the transmission line encoder (1) 107, to a convolution encoding (r=½) and an error detection encoding for each of blocks consisting of a predetermined number. Also the residual bit stream is subjected, in the transmission line encoder (2) 108, to a convolution encoding (r=⅞) and a similar error detection encoding. The error detection encoding to be employed can be a CRC (cyclic redundancy check) encoding, but there may also be employed an encoding method capable of correction, such as the RS (Read Solomon) encoding. Subsequently, both bit streams are multiplexed in the multiplexing unit 109, after the ID addition for the identification of each bit stream, then subjected to QPSK modulation and released to the transmission line T through the output terminal 110.

The modulated output signal is transmitted either through a real-time transmission path such as a satellite, a ground wave system or a cable (not shown), or by an accumulating transmission path such as a video cassette recorder or a memory disk.

In the decoding apparatus 200, the modulated signal transmitted through the above-mentioned transmission path T is received from the input terminal 201, then QPSK decoded in the separation unit 202 into a digital signal, which is further separated, based on the ID, into a convolution encoded low-quality bit stream and a convolution encoded residual bit stream. The former bit stream is supplied to the transmission line decoder (1) 203, which effects decoding of the convolution codes (r=½) obtained in the transmission line encoder (1) 107 of the encoding apparatus, and the errors are corrected by the decoding algorithm. On the other hand, the convolution encoded residual bit stream is supplied to the transmission line decoder (2) 204, which effects decoding of the convolution codes (r=⅞) obtained in the transmission line encoder (2) 108 of the encoding apparatus, and the errors are corrected by the decoding algorithm.

The low-quality bit stream decoded in the transmission line decoder (1) 203 is subjected in the information source decoder (1) 205 to decoding which is inverse to the encoding process in the information source encoder (1) 103 of the encoding apparatus, thereby providing a low-quality image signal. Also the residual bit stream decoded in the transmission line decoder (2) 204 is subjected to decoding in the information source decoder (2) 206 based on the compression executed in the information source encoder (2) 106 of the encoding apparatus, thereby providing a residual image signal. The low-quality image signal and the residual image signal are synthesized in a band synthesis unit 215, which synthesizes the low frequency components and the high frequency components to provide the original image signal.

The image signal obtained by the synthesis of the low-quality image signal and the residual image signal in the band synthesis unit 215 is then processed in a spatial filter 213 with variable transmission characteristics. It is then transmitted by the D/A converter 209 to provide an analog image signal. Such output image signal is of the lower hierarchic quality allowing enough recognition of the content of the image in case the residual image signal is not added in the adder 207 to the low-quality image signal, or of the higher hierarchic quality in case all the residual image signal is synthesized.

In the present embodiment, as explained in the foregoing, the input image signal is divided in the horizontal direction into two bands, which are respectively encoded, then multiplexed and transmitted.

In the configuration shown in FIG. 7, the control of the filter 213 by the bit error amount detecting circuit 211 and the control of the switch 208 by the bit error position detecting circuit 212 are same as those in the foregoing embodiment explained in relation to FIG. 1.

More specifically, the bit error amount detecting circuit 211 detects the BER of the received signal, then determines the C/N ratio accordingly, and generates the control signal e for the filter 213 according to the characteristics shown in FIG. 2. The filter 213 determines the filter coefficient according to the signal e and effects the filtering process on the image signal from the adder 207.

Also the bit error position detecting circuit 212 detects, based on the error detection code, the position of the error which is not corrected in the decoding of the convolution codes (r=⅞) in the residual bit stream, and controls the switch 208 in such a manner that the band synthesis unit 215 does not synthesize the residual image signal.

It is thus possible to simplify the circuit configuration by effecting the band division in the encoding side, and respectively encoding the divided bands thereby obtaining the low-quality bit stream and the reminder bit stream.

The encoding of the residual image signal of the lower hierarchy may also incorporate, in addition to the forms employed in the foregoing first to third embodiments, a pre-treatment of spatial suppression of the information amount for example by a band limitation by pre-filtering or a pixel skipping, or of temporal suppression for example by a field skipping or a frame skipping. The use of the spatial filter 213 with variable transmission characteristics is effective for such spatial suppression of the information amount, and, for the temporal suppression of the information amount it is effective to employ the temporal filter 214 with variable transmission characteristics or a spatial-temporal three-dimensional filter not shown in the foregoing embodiments.

In the foregoing embodiments, the hierarchic encoding is executed in upper and lower two layers, but it can naturally be extended to the encoding with three or more hierarchic levels.

Figure 9:
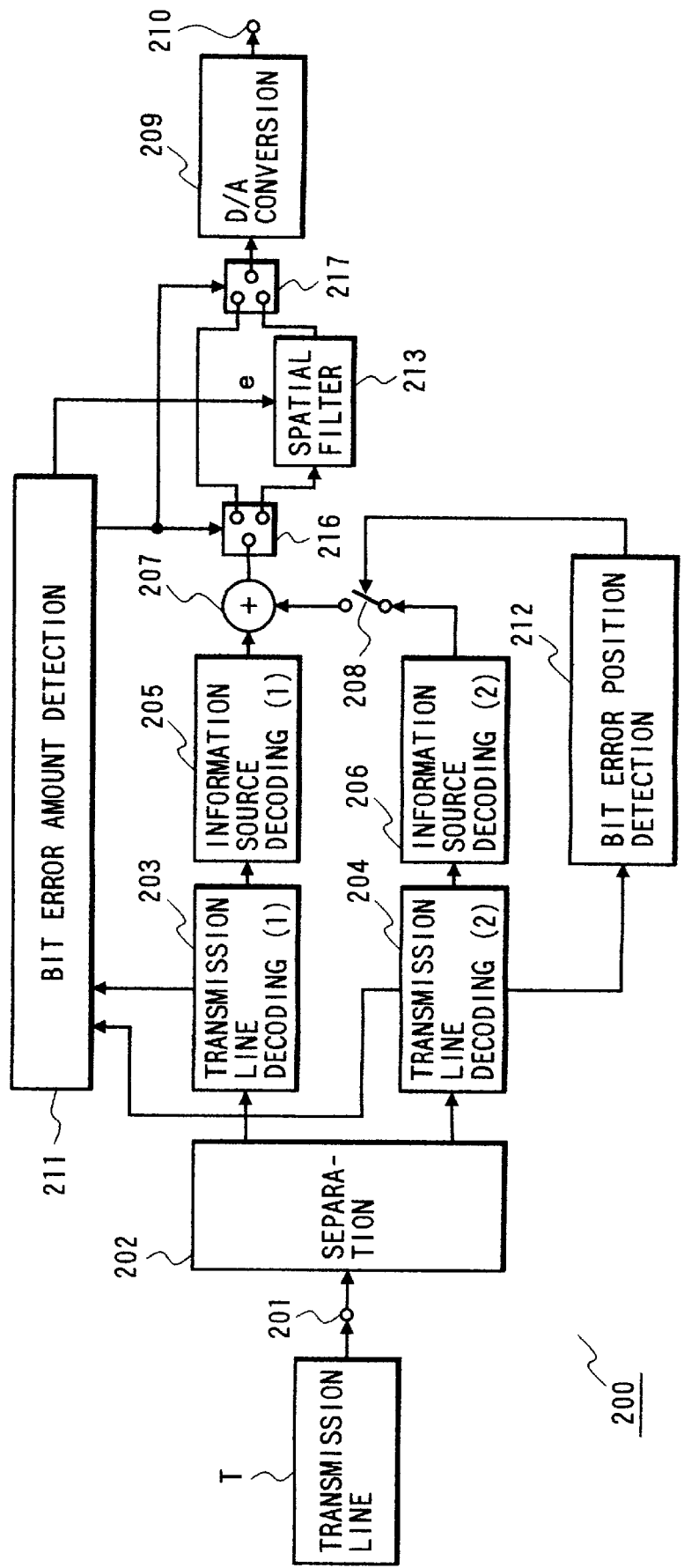
FIG. 9 is a block diagram showing the configuration of a decoding apparatus constituting still another embodiment of the present invention.

Also in the foregoing embodiments, the filter coefficient is varied only in a C/N range of 5 to 9 dB and is maintained constant in other ranges as shown in FIG. 2, but it is also possible, for example, to employ filters of fixed coefficients and to suitably select such filters as shown in FIG. 9.

Many widely different embodiments of the present invention may be constructed without departing from the spirit and scope of the present invention. It should be understood that the present invention is not limited to the specific embodiments described in the specification, except as defined in the appended claims.

What is claimed is:

1. A receiving apparatus, comprising:

reception means for receiving a hierarchically encoded image signal;

error detection means for detecting an error in the image signal received by said reception means;

decoding means for decoding the image signal received by said reception means;

filter means for performing a filter process on the image signal decoded by said decoding means; and control means for controlling the filter process of said filter means, based on an output of said error detection means.

2. An apparatus according to claim 1, wherein said control means calculates an error rate of the image signal received by said reception means, based on the output of said error detection means, and varies a filter coefficient of said filter means according to the error rate.

3. An apparatus according to claim 2, wherein said control means varies the filter coefficient of said filter means when the error rate is in a vicinity of a predetermined value, and fixes the filter coefficient of said filter means when the error rate is not in the vicinity of the predetermined value.

4. An apparatus according to claim 1, wherein said filter means performs the filter process utilizing a single frame in the image signal.

5. An apparatus according to claim 1, wherein said filter means performs the filter process utilizing simultaneously plural frames in the image signal.

6. An apparatus according to claim 1, wherein the hierarchically encoded image signal comprises a first encoded image signal having a lower image quality and a second encoded image signal for obtaining a higher image quality, and said decoding means comprises a decoding circuit for decoding said first and second encoded image signals to provide respective first and second decoded image signals, and an adder for adding the first and second decoded image signals.

7. An apparatus according to claim 6, wherein the first encoded image signal is obtained by compression encoding an original image signal, and the second encoded image signal is obtained by compression encoding a difference between the original image signal and an image signal decoded from the first encoded image signal.

8. An apparatus according to claim 6, wherein the first encoded image signal is obtained by encoding only low frequency components of an original image signal, and the second encoded image signal is obtained by encoding only high frequency components of the original image signal.

9. A receiving apparatus, comprising:

reception means for receiving an image signal in which multiplexed are a first encoded image signal having a lower image quality and a second encoded image signal for obtaining a higher image quality;

decoding means for decoding the first encoded image signal and the second encoded image signal received by said reception means to provide a first decoded image signal and a second decoded image signal respectively;

synthesis means for synthesizing the first and second decoded image signals in a synthesizing operation, thereby obtaining an obtained image signal, said synthesis means selectively outputting the obtained image signal having the higher image quality when the synthesizing operation is not inhibited and outputting the obtained image signal having the lower image quality by inhibiting the synthesizing operation;

error detection means for detecting a position of an error in an image frame of the image signal received by said reception means; and control means for controlling the synthesizing operation of said synthesis means to control the image quality of the obtained image signal based on a detection result of said error detection means.

10. An apparatus according to claim 9, wherein said control means controls said synthesis means so as to inhibit the synthesizing operation corresponding to the position of error, based on the detection result of said error detection means.

11. An apparatus according to claim 9, wherein an error detection code is attached to a predetermined amount of the image signal received by said reception means, and said error detection means detects the position of the error in the image signal received by said reception means by utilizing the error detection code.

12. An apparatus according to claim 9, wherein the first encoded image signal is obtained by compression encoding an original image signal, and the second encoded image signal is obtained by compression coding a difference between the original image signal and an image signal decoded from the first encoded image signal.

13. An apparatus according to claim 9, wherein the first encoded image signal is obtained by encoding only low frequency components of an original image signal, and the second encoded image signal is obtained by encoding only high frequency components of the original image signal.

14. An apparatus according to claim 9, wherein said error detection means detects a position of an error in an image frame of the second encoded image signal of the image signal received by said reception means.

15. An apparatus according to claim 9, wherein said reception means comprises separation means for separating the first encoded image signal and the second encoded image signal, and for outputting the first encoded image signal and the second encoded image signal to said decoding means.

16. An apparatus according to claim 15, wherein the image signal received by said reception means comprises an ID signal indicating the first and second encoded image signals, and said reception means separates the first and second encoded image signals according to the ID signal.

17. A receiving apparatus, comprising:

reception means for receiving a hierarchically encoded image signal;

error detection means for detecting an error in the image signal received by said reception means;

decoding means for decoding the image signal received by said reception means;

filter means for selectively performing a filter process on the image signal decoded by said decoding means; and control means for controlling whether said filter process on the image signal is performed by said filter means based on an output of said error detection means.

18. An apparatus according to claim 17, wherein said control means includes switch means for controlling whether or not to output the image signal to said filter means.

19. An apparatus according to claim 17, wherein said control means selectively generates one of a filter coefficient which results in a substantial filtering effect on the image signal output from said filter means and a filter coefficient which does not result in a substantial filtering effect, and said filter means processes the image signal utilizing the filter coefficients generated by said control means.

20. An apparatus for receiving and decoding an image signal in which multiplexed are a first encoded image signal having a lower image quality and a second encoded image signal for obtaining a higher image quality, comprising:

a decoder for decoding the first and second encoded image signals to provide first and second decoded image signals respectively;

a synthesizer for synthesizing the first and second decoded image signals to provide a synthesized image signal;

a filter for effecting a filter process on the synthesized image signal;

a first controller for detecting an error rate in the received image signal and varying a coefficient of said filter, based on said error rate; and a second controller for detecting a position of an error in the received image signal and controlling a synthesizing operation of said synthesizer based on the position of error.

21. A decoding apparatus, comprising:

decoding means for decoding an encoded image signal to provide a decoded image signal;

a filter for performing a filter process on the decoded image signal by effecting a calculation with a predetermined filter coefficient and the decoded image signal; and control means for detecting an error rate of the encoded image signal and varying said filter coefficient, based on the detected error rate.

22. An apparatus according to claim 21, wherein the encoded image signal comprises a first encoded image signal, which is obtained by compression encoding an original image signal, and a second encoded image signal, which is obtained by compression encoding a difference between the original image signal and an image signal decoded from the first encoded image signal.

23. An apparatus according to claim 22, wherein said decoding means comprises a decoding circuit for decoding the first and second encoded image signals to provide respective first and second decoded image signals, and an adder for adding the first and second decoded image signals.

24. An apparatus according to claim 21, wherein the encoded image signal comprises a first encoded image signal which is obtained by encoding only low frequency components of an original image signal, and a second encoded image signal which is obtained by encoding only high frequency components of the original image signal.

25. An apparatus according to claim 24, wherein said decoding means comprises a decoding circuit for decoding the first and second encoded image signals to provide respective first and second decoded image signals, and an adder for adding the first and second decoded image signals.

26. An apparatus according to claim 21, wherein said control means varies the filter coefficient of said filter when the error rate is in a vicinity of a predetermined value, and fixes the filter coefficient of said filter means when the error rate is not in the vicinity of the predetermined value.

27. An apparatus according to claim 21, wherein said filter performs the filter process utilizing a single frame of the image signal decoded by said decoding means.

28. An apparatus according to claim 21, wherein said filter performs the filter process simultaneously utilizing plural frames of the image signal decoded by said decoding means.

29. A receiving apparatus, comprising:

reception means for receiving an image signal in which multiplexed are a first encoded image signal having a lower image quality and a second encoded image signal for obtaining a higher image quality;

decoding means for decoding the first encoded image signal and the second encoded image signal received by said reception means and obtaining a first decoded image signal and a second decoded image signal;

error detection means for detecting a position of an error in an image frame of the image signal received by said reception means; and mode setting means for selectively setting a mode of said apparatus to one of a plurality of modes according to a detection result of said error detection means, the plurality of modes including a first mode in which an image signal having the higher image quality is obtained by synthesizing the first and second decoded image signals and a second mode in which an image signal having the lower image quality is obtained by inhibiting a synthesizing operation of the second decoded image signal to the first decoded image signal.

30. An apparatus according to claim 29, wherein an error detection code is attached to a predetermined amount of the image signal received by said reception means, and said error detection means detects the position of the error in the image frame of the image signal received by said reception means by utilizing the error detection code.

31. An apparatus according to claim 29, wherein the first encoded image signal is obtained by compression encoding an original image signal, and the second encoded image signal is obtained by compression encoding a difference between the original image signal and an image signal decoded from the first encoded image signal.

32. An apparatus according to claim 29, wherein the first encoded image signal is obtained by encoding only low frequency components of an original image signal, and the second encoded image signal is obtained by encoding only high frequency components of the original image signal.

33. An apparatus according to claim 29, wherein said error detection means detects the position of the error in an image frame of the second encoded image signal of the image signal received by said reception means.

34. An apparatus according to claim 29, wherein said reception means comprises separation means for separating the first encoded image signal and the second encoded image signal, and for outputting the first encoded image signal and the second encoded image signal to said decoding means.

35. An apparatus according to claim 34, wherein the image signal received by said reception means comprises an ID signal indicating the first and second encoded image signals, and said reception means separates the first and second encoded image signals according to the ID signal.

36. A receiving apparatus comprising:

reception means for receiving an image signal in which are multiplexed a first encoded image signal obtained by compression encoding an original image signal and a second encoded image signal obtained by compression encoding a difference between the original image signal and an image signal decoded from the first encoded image signal;

decoding means for decoding the first encoded image signal and the second encoded image signal received by said reception means, and obtaining a first decoded image signal and a second decoded image signal;

error detection means for detecting a position of an error in a frame of the image signal received by said reception means; and mode setting means for selectively setting a mode of said apparatus to one of a plurality of modes according to a detection result of said error detection means, wherein the plurality of modes includes a first mode, in which an image signal having a higher quality is obtained by synthesizing the first and second decoded image signals, and a second mode, in which an image signal having a lower quality is obtained by inhibiting synthesis of the first and second decoded image signals.

37. A receiving apparatus comprising:

reception means for receiving an image signal in which are multiplexed a first encoded image signal obtained by encoding only low frequency components of an original image signal and a second encoded image signal obtained by encoding only high frequency components of the original image signal;

decoding means for decoding the first encoded image signal and the second encoded image signal received by said reception means and obtaining a first decoded image signal and a second decoded image signal;

error detection means for detecting a position of an error in a frame of the image signal received by said reception means; and mode setting means for selectively setting a mode of said apparatus to one of a plurality of modes according to a detection result of said error detection means, wherein the plurality of modes includes a first mode, in which an image signal having a higher quality is obtained by synthesizing the first and second decoded image signals, and a second mode, in which an image signal having a lower quality is obtained by inhibiting synthesis of the first and second decoded image signals.

* * * * *